United States Patent
Edvardsson et al.

(10) Patent No.: US 10,184,820 B2
(45) Date of Patent: Jan. 22, 2019

(54) GUIDED WAVE RADAR LEVEL GAUGE SYSTEM FOR INTERFACE MEASUREMENT

(71) Applicant: Rosemount Tank Radar AB, Mölnlycke (SE)

(72) Inventors: Olov Edvardsson, Linköping (SE); Mikael Eriksson, Västervik (SE); Michael Larsson, Göteborg (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 320 days.

(21) Appl. No.: 15/281,341

(22) Filed: Sep. 30, 2016

(65) Prior Publication Data

US 2018/0094962 A1 Apr. 5, 2018

(51) Int. Cl.
 G01S 7/282 (2006.01)
 G01F 23/284 (2006.01)

(52) U.S. Cl.
 CPC .......... *G01F 23/284* (2013.01); *G01S 7/282* (2013.01)

(58) Field of Classification Search
 CPC ............................ G01F 23/284; G01S 7/282
 See application file for complete search history.

(56) References Cited

U.S. PATENT DOCUMENTS

| | | | | |
|---|---|---|---|---|
| 3,832,900 A | * | 9/1974 | Ross | G01F 23/284 324/643 |
| 4,135,397 A | * | 1/1979 | Krake | G01R 27/06 324/601 |
| 5,827,985 A | * | 10/1998 | Grieger | G01F 23/284 73/866.5 |
| 5,841,666 A | * | 11/1998 | Perdue | G01F 23/284 702/189 |

(Continued)

FOREIGN PATENT DOCUMENTS

| | | |
|---|---|---|
| CA | 2 314 027 | 1/2001 |
| EP | 0 833 134 | 1/1998 |

(Continued)

OTHER PUBLICATIONS

European Search Report from European Patent Application No. 17191674.5, dated Feb. 22, 2018.

*Primary Examiner* — Peter M Bythrow
(74) *Attorney, Agent, or Firm* — Westman, Champlin & Koehler, P.A.

(57) ABSTRACT

A radar level gauge system comprising: a transceiver; a tank feed-through; a power divider to divide a transmit signal into a first transmit signal and a second transmit signal; a first probe member configured to guide the first transmit signal and to return a first reflection signal, said first probe member providing a first relatively large average attenuation; a second probe member configured to guide said second transmit signal and to return a second reflection signal, said (Continued)

second probe member providing a second relatively small average attenuation; measurement signal forming circuitry for forming a measurement signal comprising a first set of echo indicators indicating reflection of said first transmit signal, and a second set of echo indicators indicating reflection of said second transmit signal; and level determining circuitry for determining a first level based on said first set of echo indicators, and a second, deeper, level based on said second set of echo indicators.

20 Claims, 9 Drawing Sheets

(56) References Cited

U.S. PATENT DOCUMENTS

| | | | | |
|---|---|---|---|---|
| 5,884,231 A | * | 3/1999 | Perdue | G01F 23/284 340/618 |
| 5,973,637 A | * | 10/1999 | Perdue | G01F 23/284 342/124 |
| 6,078,280 A | * | 6/2000 | Perdue | G01F 23/284 324/629 |
| 6,559,657 B1 | * | 5/2003 | McCarthy | G01F 23/284 324/637 |
| 6,972,712 B1 | * | 12/2005 | Karlsson | G01F 23/284 342/124 |
| 7,551,122 B1 | * | 6/2009 | Delin | G01F 23/284 342/124 |
| 7,592,946 B2 | * | 9/2009 | Klees | G01F 23/284 324/600 |
| 2002/0186025 A1 | | 12/2002 | Neven et al. | |
| 2007/0090992 A1 | * | 4/2007 | Edvardsson | G01F 23/284 342/124 |
| 2012/0319891 A1 | * | 12/2012 | Edvardsson | G01F 23/284 342/124 |
| 2012/0324994 A1 | * | 12/2012 | Welle | G01F 23/284 73/290 V |
| 2013/0009803 A1 | * | 1/2013 | Edvardsson | G01F 23/284 342/124 |
| 2015/0084809 A1 | * | 3/2015 | Flasza | G01F 23/284 342/124 |
| 2015/0226594 A1 | * | 8/2015 | Frovik | G01F 23/284 342/124 |

FOREIGN PATENT DOCUMENTS

EP  2 154 495  2/2010
WO  2016025979 A1  2/2016

* cited by examiner

GUIDED WAVE RADAR LEVEL GAUGE SYSTEM FOR INTERFACE MEASUREMENT

TECHNICAL FIELD OF THE INVENTION

The present invention relates to a guided wave radar level gauge system and to a method of determining a filling level in a tank.

TECHNICAL BACKGROUND

Radar level gauge systems are in wide use for measuring filling levels in tanks. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a transmission line probe. The transmission line probe is generally arranged vertically from top to bottom of the tank. The electromagnetic signals are subsequently reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and receipt of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity along the probe of the electromagnetic signals.

In some cases a tank may contain a stratified substance composition with several interfaces between substances at different levels. In such scenarios, it may be necessary to determine the distance between such interfaces to be able to deduce the amount of a certain substance in the tank.

Depending on the substance-dependent and often large attenuation of an electromagnetic transmit signal traveling along a transmission line probe through a substance in a tank, it may, depending on the measurement situation, be practically impossible to determine the levels of all substance interfaces in the tank by means of a conventional guided wave radar level gauge system.

To provide for improved determination of substance interface levels, US 2007/0090992 proposes the use of a transmission line probe with reduced signal coupling to the substance(s) surrounding the transmission line probe. According to US 2007/0090992, this is achieved by means of a so-called Partially External Dielectric (PED) transmission line probe.

Although the PED transmission line probe according to US 2007/0090992 considerably improves the ability to measure interface levels, there are still measurement situations where even the performance provided for through the transmission line probe according to US 2007/0090992 may not be sufficient.

One such measurement situation may be when it is desired to detect a substance, such as sand, having a relatively low dielectric constant, located below another substance, such as water, having a relatively high dielectric constant.

To handle such a situation, WO 2016/025979 suggests to simultaneously measure from the top towards to bottom of the tank, and from the bottom towards the top of the tank. To this end, WO 2016/025979 discloses a sensing element that may include an elongated stainless steel rod and an outer shield, and to enter the tank with a first coaxial cable connected to the steel rod at the bottom of the tank and a second coaxial cable connected to the steel rod at the top of the tank.

Although potentially providing for improved measurement performance in certain measurement situations, the solution according to WO 2016/025979 appears to require a feed-through between the inside and the outside of the tank that can allow passage of several coaxial cables. Such a feed-through appears to be difficult to achieve in practice, in particular when the relevant safety regulations are to be complied with.

SUMMARY OF THE INVENTION

In view of the above, it would be desirable to provide an improved radar level gauge system for substance interface measurements, in particular a guided wave radar level gauge system for substance interface measurements providing for simplified and more compact installation.

According to a first aspect of the present invention, it is therefore provided a radar level gauge system for installation at a tank containing a stratified substance composition including at least a first substance having a first density, a second substance having a second density greater than the first density, and a third substance having a third density greater than the second density, to determine a first level of a first interface between the first substance and the second substance, and a second level of a second interface between the second substance and the third substance, the radar level gauge system comprising: a transceiver arranged on an outside of the tank for generating and transmitting an electromagnetic transmit signal, and receiving an electromagnetic reflection signal; a feed-through connected to the transceiver for passing the transmit signal from the outside of the tank to an inside of the tank, and the reflection signal from the inside of the tank to the outside of the tank; a power divider arranged inside the tank and connected to the feed-through to divide the transmit signal from the transceiver into a first transmit signal and a second transmit signal, and to combine a first reflection signal and a second reflection signal to the reflection signal received by the transceiver; a first transmission line probe member having an upper end connected to the power divider and being configured to guide the first transmit signal at least partly through the stratified substance composition towards a lower end of the first transmission probe member and to return the first reflection signal resulting from reflection of the first transmit signal at any impedance discontinuities encountered thereby, the first transmission line probe member being configured to provide an interaction between the first transmit signal and the stratified substance composition resulting in a first relatively large average attenuation of the first transmit signal; a second transmission line probe member having an upper end connected to the power divider and configured to guide the second transmit signal at least partly through the stratified substance composition towards a lower end of the second transmission probe member and to return the second reflection signal resulting from reflection of the second transmit signal at any impedance discontinuities encountered thereby, the second transmission line probe member being configured to provide an interaction between the second transmit signal and the stratified substance composition resulting in a second relatively small average attenuation of the second transmit signal; measurement signal forming circuitry connected to the transceiver for forming a measurement signal based on the reflection signal and a timing relation between the transmit signal and the reflection signal, the measurement signal comprising a first set of echo indicators indicating reflection of the first transmit signal at impedance discontinuities encountered by the first transmit signal, and a second set of echo indicators indicating reflection of the second transmit signal at impedance discontinuites encountered by the first transmit signal; echo identifying circuitry connected to the measurement signal forming circuitry for identifying the first set of echo indicators and the second set of echo indicators in the measurement signal; and level determining circuitry connected to the echo identifying circuitry for determining the first level based on at least one echo indicator from the first set of echo indicators, and determing the second level based on at least one echo indicator from the second set of echo indicators.

The "substances" are not limited to any particular material phase, and may thus include solids, liquids and gases. Some examples of substances can be various petroleum products, water, sludge or sand etc.

The interfaces between substances may be sharp or more or less diffuse depending on the substances and the conditions in the tank. There may, for instance, be an emulsion zone between substances.

The "transceiver" may be one functional unit capable of transmitting and receiving electromagnetic signals, or may be a system comprising separate transmitter and receiver units.

The tank may be any container or vessel capable of containing a product, and may be metallic, or partly or completely non-metallic, open, semi-open, or closed.

The power divider may by any device capable of dividing the power carried by the transmit signal between the first transmission line probe member and the second transmission line probe member. The, per se, well-known Wilkinson type power divider would be suitable, but many other power dividers would be feasible. For instance, a simple T-junction is expected to be sufficient, at least for some applications.

By the "average attenuation" of a transmit signal along a transmission line probe member should be understood the total signal reduction (for instance in dB) along the length of the transmission line probe member divided by the total length of the transmission line probe member.

The present invention is based upon the realization that difficult interface measurements can be carried out without the need for a special tank-feed-through, by dividing the transmit signal, following passage through the tank feed-through, using a power divider arranged and providing thus divided first and second transmit signals to respective transmission line probes with different propagation characteristics, optimized for different measurement depths in the tank.

The present inventors have further realized that first echoes originating from reflection of the first transmit signal and second echoes originating from reflection of the second transmit signal can be identified, and that different interface levels can be determined based on the first echoes and the second echoes, respectively. In other words, relatively deep interface levels can be determined using signals propagated by a transmission line member configured for relatively weak signal coupling with the surrounding substance(s), while relatively shallow interface levels can be determined using signals propagated by a transmission line member configured for relatively strong signal coupling with the surrounding substance(s).

Since a non-standard tank feed-through may add cost and complexity, and may be relatively bulky, embodiments of the present invention provide for simplified and more cost-efficient measurement of several substance interface levels.

According to embodiments, the second transmission line probe member may comprise a probe conductor connected to the power divider; and a first dielectric layer at least partly enclosing the probe conductor. Advantageously, the first dielectric layer may completely enclose the probe conductor along an entire length of the second transmission line probe member.

The first dielectric layer may advantageously form a dielectric enclosing structure extending along a substantial portion of the second transmission line probe member, such as along the entire length of the second transmission line probe member arranged inside the tank.

This type of the transmission line probe can be referred to as a Partially External Dielectric (PED) transmission line probe.

The propagation velocity along a PED transmission line probe is characterized by an effective dielectric constant $\epsilon_{eff}$ which depends on the dielectric constant of the dielectric enclosing structure $\epsilon_{int}$ and the dielectric constant of the surrounding medium (air, steam, product vapor, probe contamination etc) $\epsilon_{ext}$. The propagation velocity of the electromagnetic signal travelling along the PED transmission line probe is given by the velocity of light divided by the square root of $\epsilon_{eff}$.

The effective dielectric constant $\epsilon_{eff}$ of the PED transmission line probe at least approximately depends on the dielectric constant of the dielectric enclosing structure $\epsilon_{int}$ and the dielectric constant of the surrounding medium $\epsilon_{ext}$ according to the following relation:

$$\varepsilon_{eff} \sim \frac{1}{\dfrac{\alpha}{\epsilon_{ext}} + \dfrac{1-\alpha}{\varepsilon_{int}}}$$

where $\alpha$ is a number between 0 and 1 which indicates the degree of coupling to the surrounding medium. With $\alpha=1$, we have naked wires (and maximum influence of the surrounding medium) and with $\alpha=0$ we have a line fully screened from the surrounding medium (such as a closed coaxial line). It should be noted that, depending on the geometry of the transmission line probe member, the exact calculation can be a bit different, but the important thing is that the coupling to the exterior liquid can be adapted to fit the requirements by a suitable probe configuration and/or selection of dielectric material.

In embodiments of the radar level gauge system according to the present invention, it can thus be said that the first transmission line member has a first average coupling factor $\alpha_1$ for signal propagation through the stratified substance composition, which is higher than the second average coupling factor $\alpha_2$ of the second transmission line member, for signal propagation through the stratified substance composition.

According to various embodiments, the first transmission line probe member may comprise: a probe conductor connected to the power divider; and a second dielectric layer, different from the first dielectric layer comprised in the second transmission line probe member, at least partly enclosing the probe conductor. Advantageously, the second dielectric layer may completely enclose the probe conductor along an entire length of the first transmission line probe member.

The second dielectric layer may be different from the first dielectric layer in various ways. For instance, the dielectric materials may be different (have different relative dielectric constants), and/or the physical configurations may be different. For example, the enclosing thicknesses may be different. The properties of the first and second dielectric layers may advantageously be selected to achieve the above-mentioned relation between the first average coupling factor $\alpha_1$ (relatively high), and the second average coupling factor $\alpha_2$ (relatively low).

Furthermore, the first and/or second dielectric layers (where applicable) may be configured to provide different coupling between the first and second transmit signals, respectively and a given surrounding medium at different vertical positions in the tank. For instance, the first (and/or second) dielectric layer may be configured to provide for a weaker coupling for deeper levels in the tank. In this manner, for example, relatively weak oil echoes can be distinguished, while providing for decreased attenuation in a water layer underneath the oil layer.

According to embodiments, the first transmission line probe may comprise a first probe conductor conductively connected to the power divider to receive the first transmit signal from the power divider, and a shielding conductor extending along at least a portion of the first probe conductor; and the second transmission line probe may comprise a second probe conductor conductively connected to the power divider to receive the second transmit signal from the power divider, and the shielding conductor extending along at least a portion of the first probe conductor and the second probe conductor.

Hence, the shielding conductor may be included in both the first transmission line member and the second transmission line member. The shielding conductor may be configured in many different ways. For instance, as an H-profile, as an E-profile, as an S-provfile, or as a U-profile.

Advantageously, the shielding conductor may be configured to provide different coupling between at least one of the first transmit signal and the second transmit signal, and a given surrounding medium at different vertical positions in the tank.

According to various embodiments, the second transmission line probe member may comprise: a probe conductor connected to the power divider; and a shielding conductor spaced apart from the probe conductor and extending along at least a portion of the second transmission line probe member, starting from the upper end of the second transmission line probe member.

The shielding conductor may be connected to electrical ground, for instance through direct conductive connection to a conductive tank ceiling where applicable.

Through the use of a shielding conductor between the probe conductor and the substance(s) in the tank, the signal coupling between the probe conductor and the substance(s) can be reduced, which in turn reduces the attenuation of the second transmit signal.

According to various embodiments, furthermore, the first transmission line probe member may comprise a probe conductor connected to the power divider; the second transmission line probe member may comprise a probe conductor connected to the power divider; and the probe conductor of the first transmission line probe member may be conductively connected to the probe conductor of the second transmission line probe member at the lower ends of the first transmission line probe member and the second transmission line probe member.

These embodiments provide for measurement from the top of the tank towards the bottom using the first transmission line probe member, and from the bottom of the tank (lower end of the second transmission line probe member) towards the top using the second transmission line probe member.

Such a measurement configuration provides for increased temporal separation between the first set of echo indicators indicating reflection of the first transmit signal at impedance discontinuities encountered by the first transmit signal, and the second set of echo indicators indicating reflection of the second transmit signal at impedance discontinuites encountered by the second transmit signal. This can, in turn, facilitate the identification of the first and second sets of echo indicators, respectively, which may improve or at least facilitate the determination of the first and second levels.

To further increase the above-mentioned temporal separation, the probe conductor of the first transmission line probe member may be conductively connected to the probe conductor of the second transmission line probe member at the lower ends of the first transmission line probe member and the second transmission line probe member through a delay line.

Various delay lines are well-known to one of ordinary skill in the relevant art. For instance, a coaxial line with a dielectric having a relatively high dielectric constant can be used to delay the signals.

To ensure that sufficient signal strength remains at the lower end of the probe conductor of the second transmission line member to provide for the desired "bottom-up" measurement, measures may be taken to reduce the signal attenuation in the second transmission line probe member.

According to embodiments, the second transmission line probe member may therefore comprise a shielding conductor spaced apart from the probe conductor and extending along at least a portion of the second transmission line probe member. The shielding conductor may extend from the upper end of the second transmission line probe member.

Advantageously, this shielding conductor may extend to the lower end of the second transmission line probe member.

Moreover, at least one of the first transmission line probe member and the second transmission line probe member may comprise a delay portion for increasing a temporal separation between the first reflection signal and the second reflection signal. Such a delay portion may, for example, be a portion of the probe member having a dielectric material with a relatively high dielectric constant.

According to a second aspect of the present invention, it is provided a method of determining interface levels in a tank containing a stratified substance composition including at least a first substance having a first density, a second substance having a second density greater than the first density, and a third substance having a third density greater than the second density, using a radar level gauge system comprising: a transceiver arranged on an outside of the tank; a feed-through connected to the transceiver; a power divider arranged inside the tank and connected to the feed-through; a first transmission line probe member connected to the power divider and providing a first average attenuation for signal propagation through the stratified substance composition; a second transmission line probe member connected to the power divider and providing a second average attenuation, smaller than the first average attenuation, for signal propagation through the stratified substance composition;

and processing circuitry, the method comprising the steps of: generating and transmitting, by the transceiver, an electromagnetic transmit signal; passing, by the feed-through, the transmit signal from the outside of the tank to an inside of the tank; dividing, by the power divider, the transmit signal into a first transmit signal and a second transmit signal; guiding, by the first transmission line probe member, the first transmit signal at least partly through the stratified substance composition; guiding, by the second transmission line probe member, the second transmit signal at least partly through the stratified substance composition; returning, by the first transmission line probe member, a first reflection signal resulting from reflection of the first transmit signal at any impedance discontinuities encountered thereby; returning, by the second transmission line probe member, a second reflection signal resulting from reflection of the second transmit signal at any impedance discontinuities encountered thereby; combining, by the power divider, the first reflection signal and the second reflection signal into a combined reflection signal; passing, by the feed-through, the combined reflection signal to the transceiver; receiving, by the transceiver, the combined reflection signal; and determining, by the processing circuitry, a first level of a first interface between the first substance and the second substance, and a second level of a second interface between the second substance and the third substance based on the combined reflection signal.

It should be noted that the steps of methods according to embodiments of the present invention need not necessarily be carried out in any particular order, unless explicitly or implicitly required.

According to various embodiments, the step of determining may comprise the steps of: forming a measurement signal based on the combined reflection signal and a timing relation between the transmit signal and the combined reflection signal, the measurement signal comprising a first set of echo indicators indicating reflection of the first transmit signal at impedance discontinuities encountered by the first transmit signal, and a second set of echo indicators indicating reflection of the second transmit signal at impedance discontinuites encountered by the first transmit signal; identifying the first set of echo indicators and the second set of echo indicators in the measurement signal; and determining the first level based on at least one echo indicator from the first set of echo indicators, and determing the second level based on at least one echo indicator from the second set of echo indicators.

Further embodiments of, and effects obtained through this second aspect of the present invention are largely analogous to those described above for the first aspect of the invention.

In summary, the present invention thus relates to a radar level gauge system comprising: a transceiver; a tank feed-through; a power divider to divide a transmit signal into a first transmit signal and a second transmit signal; a first probe member configured to guide the first transmit signal and to return a first reflection signal, said first probe member providing a first relatively large average attenuation; a second probe member configured to guide said second transmit signal and to return a second reflection signal, said second probe member providing a second relatively small average attenuation; measurement signal forming circuitry for forming a measurement signal comprising a first set of echo indicators indicating reflection of said first transmit signal, and a second set of echo indicators indicating reflection of said second transmit signal; and level determining circuitry for determining a first level based on said first set of echo indicators, and a second, deeper, level based on said second set of echo indicators.

BRIEF DESCRIPTION OF THE DRAWINGS

These and other aspects of the present invention will now be described in more detail, with reference to the appended drawings showing example embodiments of the invention, wherein.

DETAILED DESCRIPTION OF AN EXAMPLE EMBODIMENT OF THE INVENTION

Figure 1:
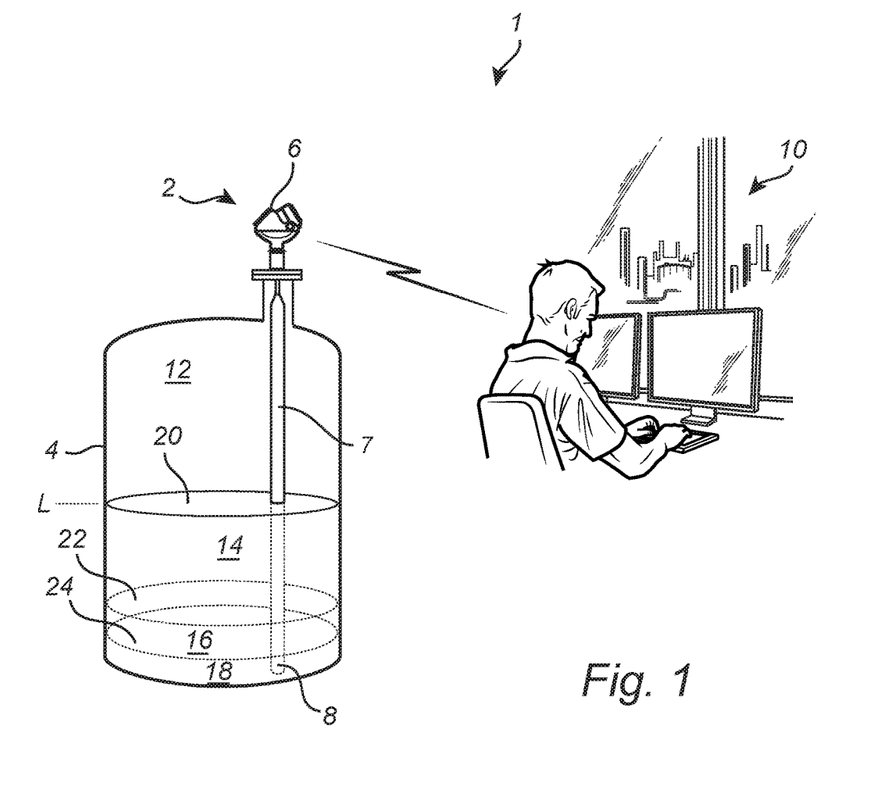
FIG. 1 schematically illustrates an exemplary tank arrangement comprising a radar level gauge system according to an embodiment of the present invention.

FIG. 1 schematically shows a level measuring system 1 comprising a radar level gauge system 2 according to an example embodiment of the present invention, and a host system 10 illustrated as a control room.

The radar level gauge system 2, which is of GWR (Guided Wave Radar) type, is arranged at a tank 4 having a tubular mounting structure 13 (often referred to as a "nozzle") extending substantially vertically from the roof of the tank 4.

In the present exemplary measurement situation, the tank 4 contains a stratified substance composition comprising a first substance 12, a second substance 14, a third substance 16, and a fourth substance 18. In this particular example, the first substance 12 may be air or vapor, the second substance 14 may be oil, the third substance 16 may be water, and the fourth substance 18 may be sand. Due to the different densities of the substances in the stratified substance composition (and due to the fact that these substances are substantially immiscible), there is a first interface 20 between the first substance 12 and the second substance 14, a second interface 22 between the second substance 14 and the third substance 16, and a third interface 24 between the third substance 16 and the fourth substance 18.

The radar level gauge system 2 is installed to measure the levels of the first 20, second 22 and third 24 interfaces. The radar level gauge system 2 comprises a measuring electronics unit 6 arranged outside the tank 4, and a transmission line probe arrangement 7, extending from the measuring electronics unit 6, through the tubular mounting structure 13, towards and into the stratified substance composition. Various embodiments of the radar level gauge system 2 and, in particular, different transmission line probe arrangements 7 will be described in detail further below.

Figure 2A:
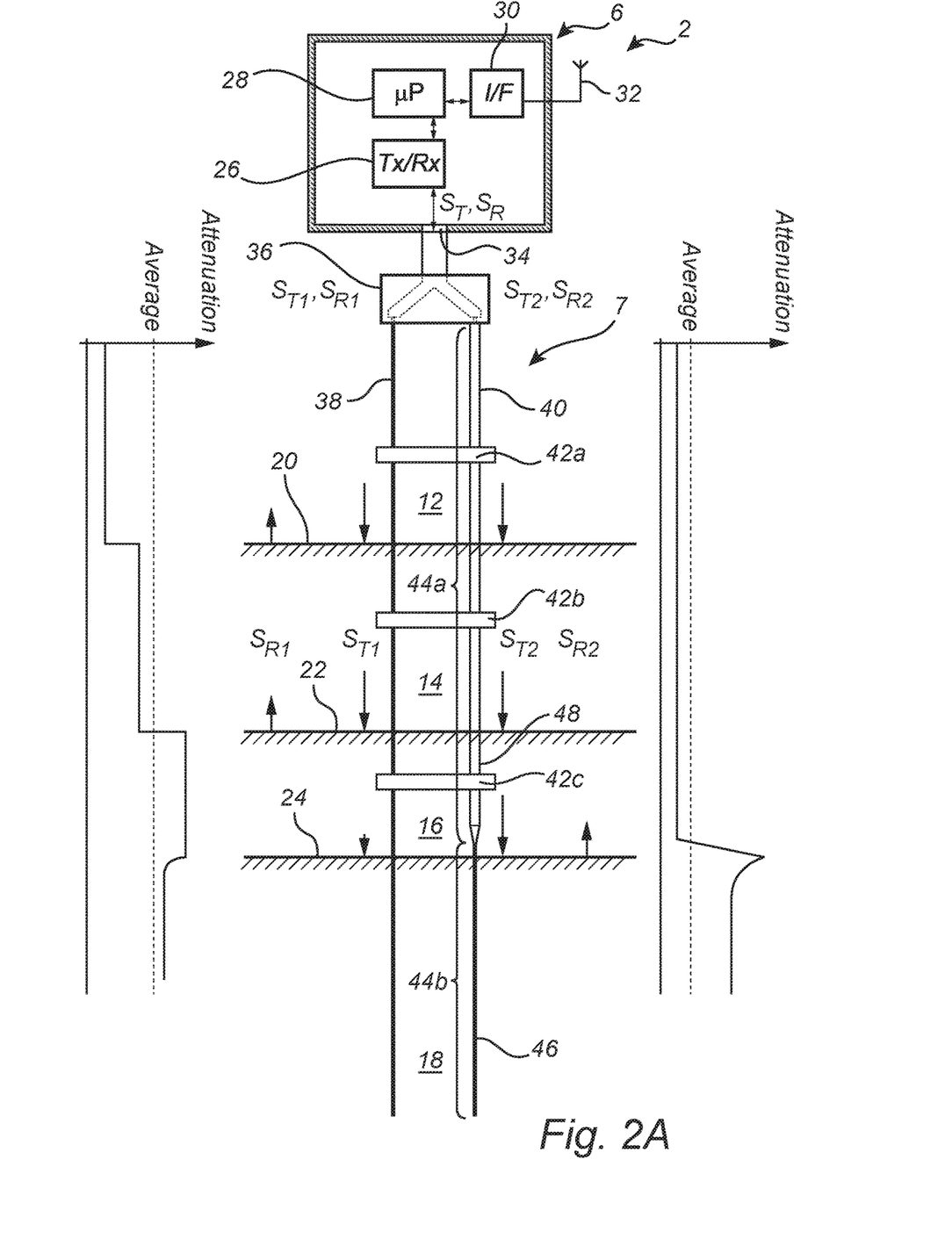
FIG. 2A schematically illustrates a first embodiment of the radar level gauge system in FIG. 1.

FIG. 2A schematically shows a first embodiment of the radar level gauge system 2 in FIG. 1. Referring to FIG. 2A, the measurement electronics unit 6 comprises a transceiver 26, processing circuitry 28, a communication interface 30, and a communication antenna 32 for wireless communication with the control room 10 in FIG. 1.

As is schematically shown in FIG. 2A, the radar level gauge system 2 further comprises a tank feed-through 34, a power divider 36, a first transmission line probe member 38, a second transmission line probe member 40, and spacers 42a-c keeping the first 38 and second 40 transmission line probe members in place.

The transceiver 26 is configured to generate, transmit and receive electromagnetic signals. The feed-through 34 is connected to the transceiver 36 for passing the transmit signal $S_T$ from the outside of the tank 4 to an inside of the tank 4, and the reflection signal $S_R$ from the inside of the tank 4 to the outside of the tank 4. The power divider 36 is arranged inside the tank and connected to the feed-through 34 to divide the transmit signal $S_T$ from the transceiver 36 into a first transmit signal $S_{T1}$ and a second transmit signal $S_{T2}$, and to combine a first reflection signal $S_{R1}$ and a second reflection signal $S_{R2}$ to the reflection signal $S_R$ received by the transceiver 26.

With continued reference to FIG. 2A, the first transmission line probe member 38 has an upper end connected to the power divider 36, and the second transmission line probe member 40 has an upper end connected to the power divider 36.

As is schematically indicated by the arrows at the first 20, second 22 and third 24 interfaces, the first transmission line probe member 38 is configured to guide the first transmit signal $S_{T1}$ through the stratified substance composition towards a lower end of the first transmission probe member 38 and to return the first reflection signal $S_{R1}$ resulting from reflection of the first transmit signal $S_{T1}$ at any impedance discontinuities encountered thereby.

Similarly, the second transmission line probe member 40 is configured to guide the second transmit signal $S_{T2}$ through the stratified substance composition towards a lower end of the second transmission probe member 40 and to return the second reflection signal $S_{R2}$ resulting from reflection of the second transmit signal $S_{T1}$ at any impedance discontinuities encountered thereby.

As is schematically indicated in FIG. 2A, the second transmission line probe member 40 has a first portion 44a, and a second portion 44b. Along the first portion 44a, the second transmission line probe member 40 comprises a probe conductor 46 and a shielding conductor 48, with a dielectric material filling the space between the probe conductor 46 and the shielding conductor 48. In the embodiment of FIG. 2A, the second transmission line probe member is thus a coaxial line in the first portion 44a, and a single conductor probe (sometimes also referred to as a Goubau probe) in the second portion 44b. Between the first portion 44a and the second portion 44b, there is an impedance matching segment, along which the dielectric of the coaxial line is gradually reduced in thickness.

In the first portion 44a, where the second transmission line probe member 40 is a coaxial line, the attenuation of the second transmit signal $S_{T2}$ is very small and may be practically independent of the properties of the surrounding substance(s) in the first portion 44a. In the second portion 44b, the attenuation of the second transmit signal $S_{T2}$ is considerably larger and depends on the properties of the surrounding substance(s). This is schematically indicated in the attenuation diagram on the right hand side of the FIG. 2A.

In the third substance 16, which may for example be water, the attentuation is rather high, to then decrease in the fourth substance 18, which may for example be sand. The average attenuation of the second transmit signal $S_{T2}$ along the second transmission line probe member 40 is schematically indicated by the dashed line in the attenuation diagram to the right in FIG. 2A.

Turning now to the first transmission line probe member 38, this probe member is, as is schematically shown in FIG. 2A, an single line probe with a relatively thin dielectric coating along the entire length thereof. Due to this configuration of the first transmission line probe member 38 (high coupling factor α), the attenuation of the first transmit signal $S_{T1}$ along the first transmission line probe member 38 is relatively high, and dependent on the properties of the surrounding substance(s). This is schematically indicated in the attenuation diagram to the left of FIG. 2A, where it is indicated that the attenuation increases at the first interface 20, then increases again at the second interface 22, and finally decreases at the third interface 24. The average attenuation of the first transmit signal $S_{T1}$ along the first transmission line probe member 38 is schematically indicated by the dashed line in the attenuation diagram to the left in FIG. 2A. The average attenuation of the first transmit signal $S_{T1}$ is higher than the average attenuation of the second transmit signal $S_{T2}$.

The different attenuations in the first 38 and second 40 transmission line member, respectively are reflected by the arrows in FIG. 2A, schematically indicating the signal strength of the respective transmit signals and reflection signals at the first 20, second 22, and third 24 substance interfaces.

As is schematically indicated just to the left of the first transmission line probe member 38 in FIG. 2A, the first transmit signal $S_{T1}$ is so attenuated at the third substance interface 24 that there is no contribution to the first reflection signal $S_{R1}$ from reflection at the third substance interface 24.

Turning to the second transmission line probe member 40, there is no contribution to the second reflection signal $S_{R2}$ from reflection at the first 20 and second 22 substance interfaces, since the second transmit signal $S_{T2}$ was shielded by the shielding conductor 48 when the second transmission line probe member 40 passed those substance interfaces. Since the second transmit signal $S_{T2}$ was only slightly attenuated along the first probe portion 44a, and there were no reflection losses, there is sufficient signal strength left at the third substance interface 24 to give a significant contribution to the second reflection signal $S_{R2}$.

Figure 2B:
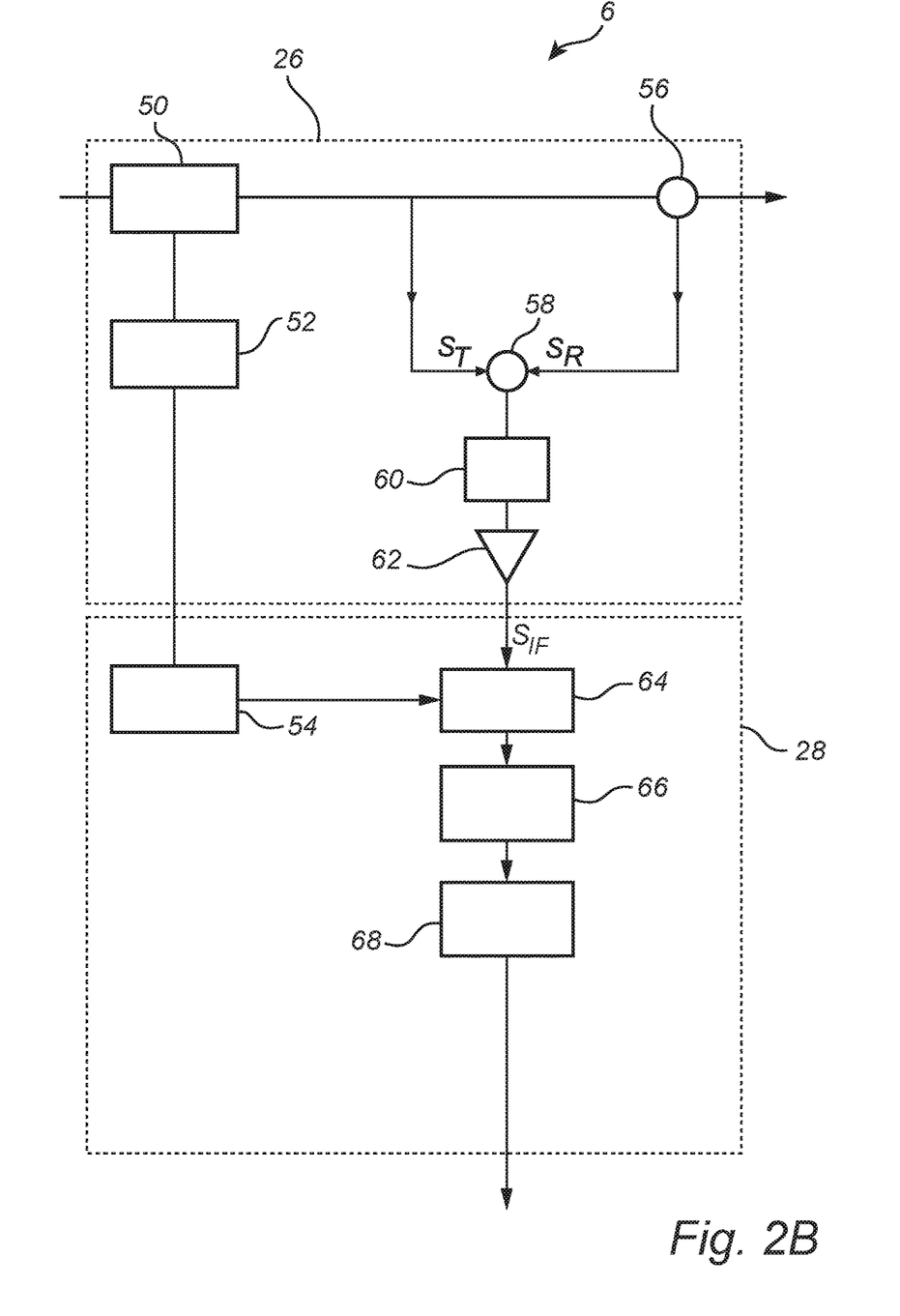
FIG. 2B is a more detailed schematic block diagram of the measurement electronics unit in FIG. 2A.

Referring now to FIG. 2B, there is shown a more detailed block diagram of the transceiver 26 and processing circuitry 28 in FIG. 2A according to an embodiment of the present invention.

The transceiver 26 here includes a microwave source 50 driven by a step generator 52, in turn controlled by timing circuitry 54 forming part of the processing circuitry 28. The microwave source 50 is connected to the tank feed-through (not shown in FIG. 2B) via a power divider 56 in the transceiver 26. The power divider 56 is arranged to connect the reflection signal $S_R$ coming from the tank feed-through to a mixer 58, which is also connected to receive the transmit signal $S_T$ from the microwave source 50. The mixer output is connected to a low pass filter 60 and an amplifier 62.

The processing circuitry 28 here includes, in addition to the timing circuitry 54 mentioned above, measurement signal forming circuitry, in the form of sampler 64 configured to receive and sample the intermediate frequency signal $S_{IF}$ output by the mixer 58, low pass filtered by the low pass filter 60 and amplified by the amplifier 62. The sampler 64 may, for instance, comprise a sample-and-hold circuit in combination with an A/D-converter, or be realized as a sigma-delta converter. The sampler 64 is controlled by the timing circuitry 54 to be synchronized with the transmit signal $S_T$. The processing circuitry 28 further includes echo identifying circuitry 66, and level determining circuitry 68.

While the elements of the transceiver 26 are typically implemented in hardware, and form part of an integrated unit normally referred to as a microwave unit, at least some portions of the processing circuitry 28 may typically be embodied by software modules executed by an embedded processor. The invention is not restricted to this particular realization, and any implementation found suitable to realize the herein described functionality may be contemplated.

A method according to an example embodiment of the present invention will now be described with reference to FIG. 3. FIGS. 2A-B will also be referred to concerning the structure of a radar level gauge system 2 in which the method is implemented, and the diagram in FIG. 4 will be referred to when appropriate during the description of the method.

Figure 3:
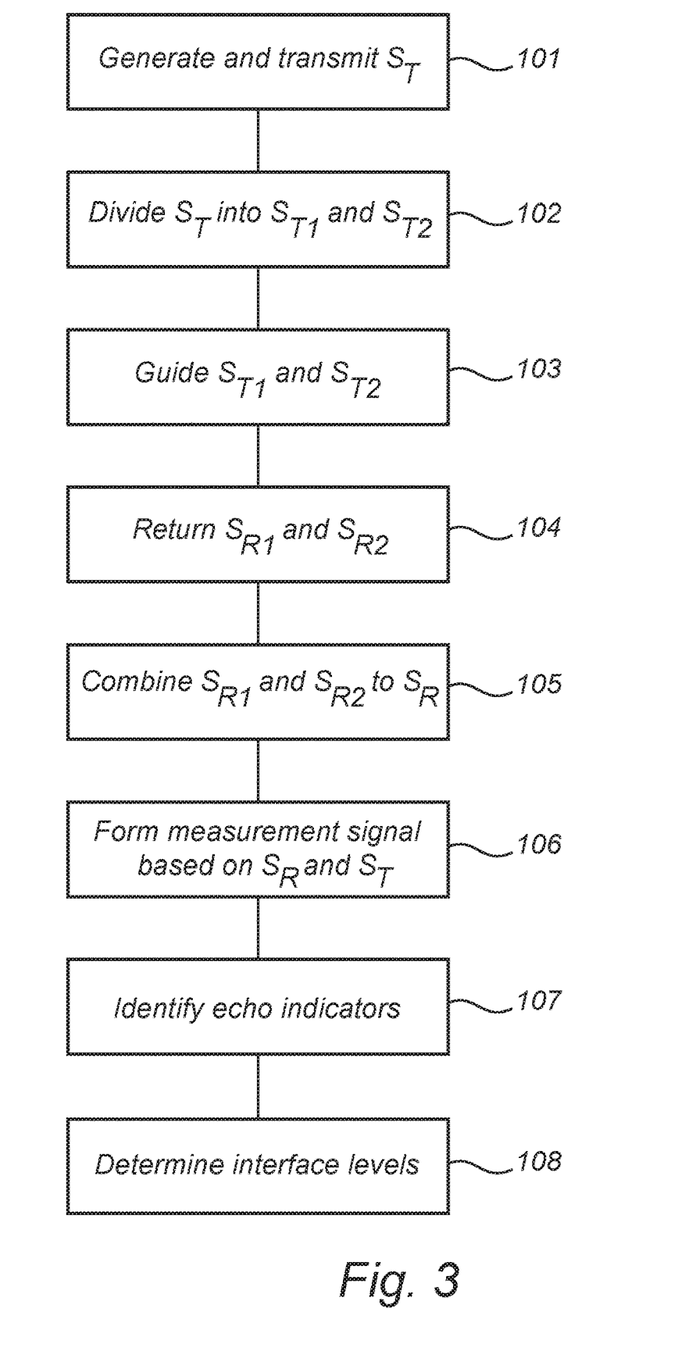
FIG. 3 is a flow-chart schematically illustrating an example embodiment of the method according to the present invention.

Turning first to FIG. 3, a transmit signal $S_T$ is generated and transmitted by the transceiver 26 in a first step 101. The transmit signal $S_T$ is subsequently, in step 102, divided by the power divider 36 into a first transmit signal $S_{T1}$ and a second transmit signal $S_{T2}$.

In the next step 103, the first transmit signal $S_{T1}$ is guided by the first transmission line probe member 38 at least partly through the stratified substance composition in the tank 4, and the second transmit signal $S_{T2}$ is guided by the second transmission line probe member 40 at least partly through the stratified substance composition in the tank 4.

A first reflection signal $S_{R1}$ is returned by the first transmission line probe member 38, and a second reflection signal $S_{R2}$ is returned by the second transmission line probe member 40 in step 104.

Thereafter, in step 105, the first $S_{R1}$ and second $S_{R2}$ reflection signals are combined by the power divider 36 to form a combined reflection signal $S_R$, which is passed through the feed-through 34 and returned to the transceiver 26.

In the transceiver, referring to FIG. 2B, the combined reflection signal $S_R$ is mixed with the transmit signal $S_T$ by the mixer 58, and the resulting intermediate frequency signal $S_{IF}$ is sampled by the sampler 64 to form a digital measurement signal in step 106.

Figure 4:
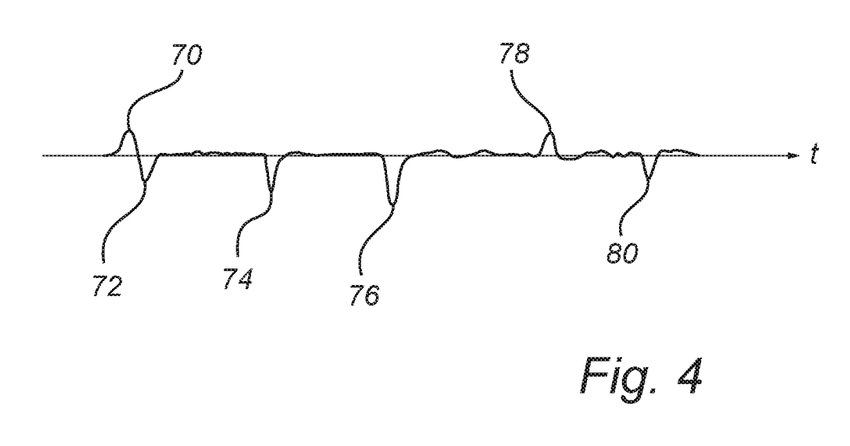
FIG. 4 is an exemplary echo curve obtained using the radar level gauge system in FIG. 2A.

An exemplary measurement signal for the measurement configuration in FIG. 2A is schematically shown in FIG. 4. As can be seen in FIG. 4, the measurement signal comprises a number of echo indicators, indicating reflection at impedance discontinuities encountered by the first transmit signal $S_{T1}$ and the second transmit signal $S_{T2}$. Referring to FIG. 4, the first echo indicator, which is a positive peak 70, indicates reflection at the feed-through 34, the second echo indicator, which is a negative peak 72, indicates reflection at the power divider 36, the third echo indicator, which is a negative peak 74, indicates reflection at the first interface 20, the fourth echo indicator, which is a negative peak 76, indicates reflection at the second interface 22, the fifth echo indicator, which is a positive peak 78, indicates reflection at the third interface 24, and the sixth echo indicator, which is a negative peak 80, indicates reflection at the end of the second transmission line probe member 40.

Some of these echo indicators indicate reflection of both the first transmit signal $S_{T1}$ and the second transmit signal $S_{T2}$, other echo indicators indicate reflection of the first transmit signal $S_{T1}$ only, and yet other echo indicators indicate reflection of the second transmit signal $S_{T2}$ only.

In the example diagram of FIG. 4, which relates to the measurement situation in FIG. 2A, the first 70 and second 72 echo indicators indicate reflection of the transmit signal $S_T$ before division into the first $S_{T1}$ and second $S_{T2}$ transmit signals. The third 74 and fourth 76 echo indicators indicate reflection of the first transmit signal $S_{T1}$, because the second transmit signal $S_{T2}$ is shielded from the surrounding substance(s) due to the configuration of the second transmission line probe member 40 in the first portion 44a thereof as was described further above. Finally, the fifth 78 and sixth 80 echo indicators indicate reflection of the second transmit signal $S_{T2}$, because the first transmit signal $S_{T1}$ has been too attenuated to provide more than a negligible reflection at the third interface 24 or the end of the first transmission line probe member 38. Accordingly, a first set of echo indicators (the third 74 and fourth 76 echo indicators) indicating reflection of the first transmit signal $S_{T1}$, and a second set of echo indicators (the fifth 78 and sixth 80 echo indicators) indicating reflection of the second transmit signal $S_{T2}$ are identified in step 107. The identification is based on known properties of the first transmission line probe member 38 and the second transmission line probe member 40, and is carried out automatically by the echo identifier 66 in the processing circuitry 28.

Finally, in step 108, the level of the first 20 interface is determined based on the third echo indicator 74, the level of the second 22 interface is determined based on the fourth echo indicator 76, and the level of the third 24 interface is determined based on the fifth echo indicator 78.

It should be noted that the echo indicator identification briefly described above is for a relatively simple case. In embodiments, there may be both an echo indicator indicating reflection of the first transmit signal at a particular substance interface, and another echo indicator indicating reflection of the second transmit signal at the same substance interface. To make it easier to distinguish such echo indicators from each other, a delay portion (not shown in FIG. 2A) may be provided at the top of one of the first 38 and second 40 transmission line probe members to provide for better temporal separation between echo indicators indicating reflection at the same substance interface.

Other embodiments of the radar level gauge system 2 according to the present invention will now be described with reference to FIGS. 5A-B and FIG. 6. The above-described exemplary method is straight-forward to apply to these other embodiments as well.

Figure 5A:
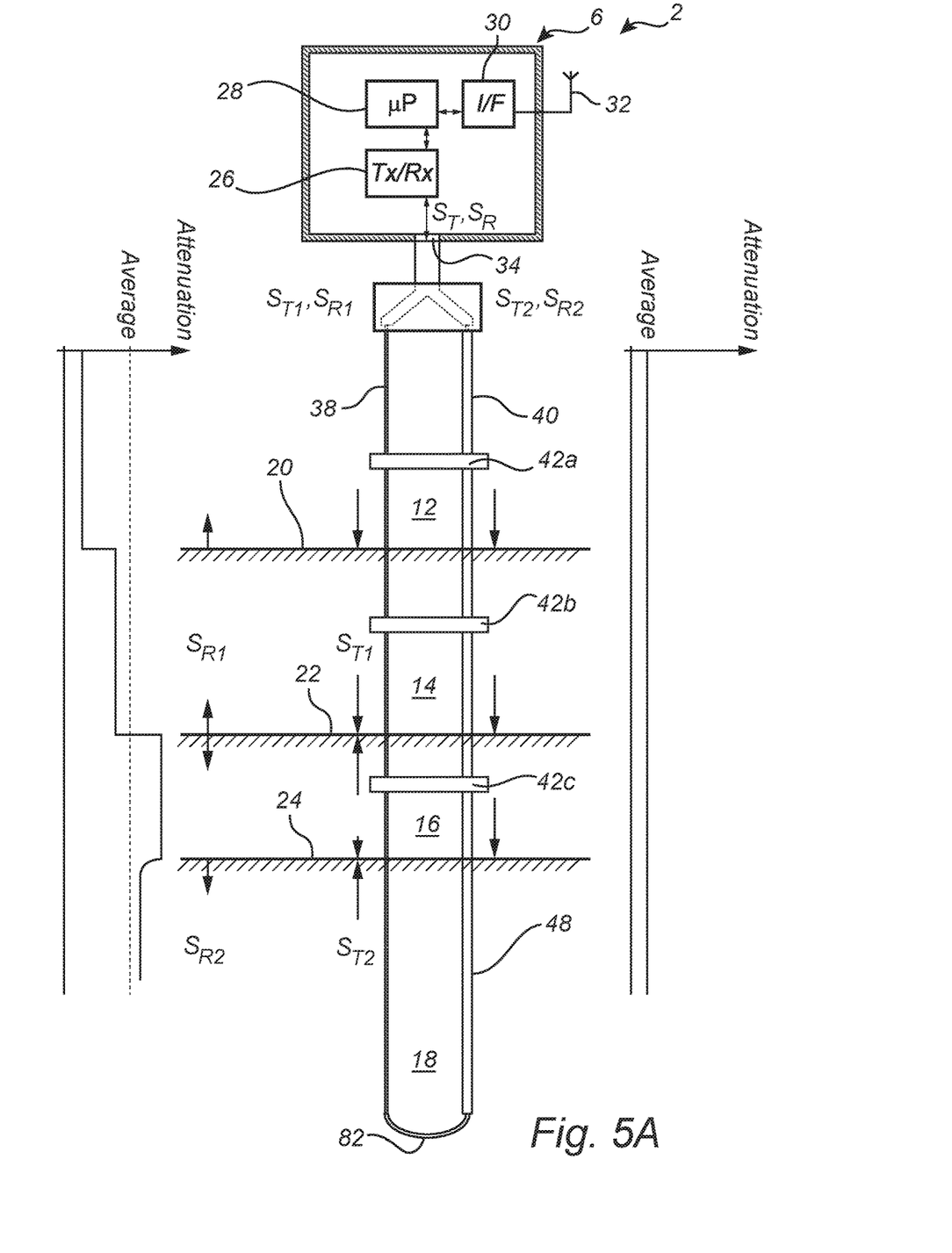
FIG. 5A schematically illustrates a second embodiment of the radar level gauge system in FIG. 1.

FIG. 5A schematically shows a second embodiment of the radar level gauge system 2 in FIG. 1. The second embodiment in FIG. 5A differs from the first embodiment in FIG. 2A in that the second transmission line probe member 40 is shielded by a shielding conductor 48 all the way to the lower end of the second transmission line probe member 40, and that the lower end of the second transmission line probe member 40 is conductively connected to the lower end of the first transmission line probe member 38 by a connecting line 82, which may be delay line, such as a coaxial cable with a dielectric having a relatively high dielectric constant.

Due to this difference in configuration, the second transmit signal $S_{T2}$ will be (partly) reflected at the substance interfaces starting from the bottom of the tank 4. This is schematically indicated in FIG. 5A, where the second transmit signal $S_{T2}$ is first reflected at the third substance interface 24, and then at the second substance interface 22. The first transmission line probe member 38 has the same configuration as in the first embodiment shown in FIG. 2A, so that the first transmit signal $S_{T1}$ is first reflected by the first substance interface 20 and then by the second substance interface 22. It should be noted that the first transmission line probe member 38 has a higher average attenuation than the second transmission line probe member 40, just as was the case for the first embodiment described above.

Figure 5B:
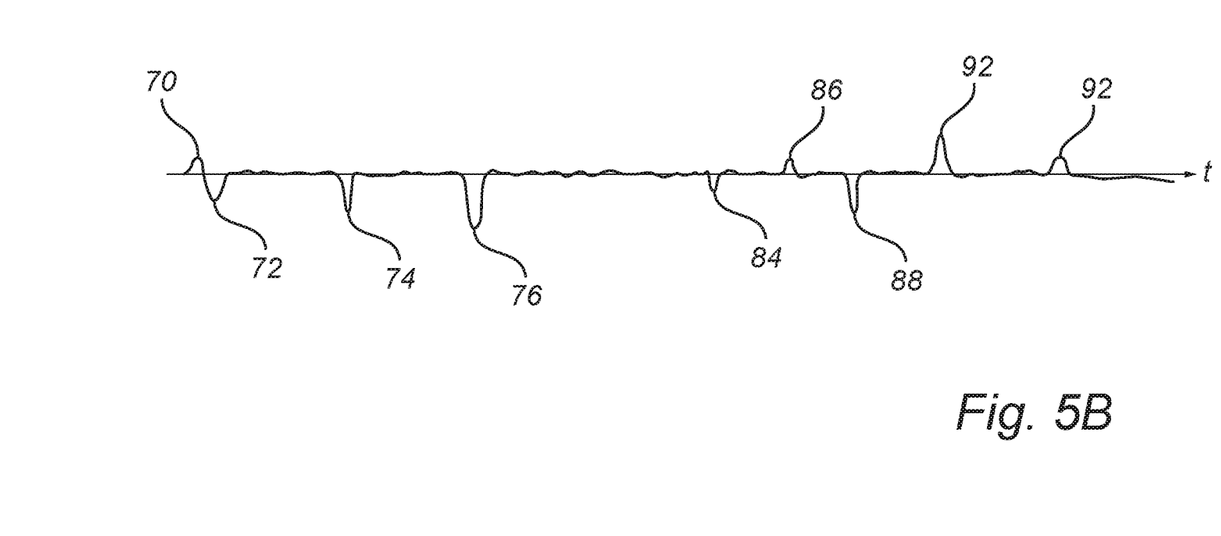
FIG. 5B is an exemplary echo curve obtained using the radar level gauge system in FIG. 5A.

The configuration of the second embodiment of FIG. 5A may result in the measurement signal schematically shown in FIG. 5B. Like the measurement signal in FIG. 4, the measurement signal in FIG. 5B comprises echo indicators indicating reflection at the feed-through, at the power divider, at the first interface 20 (from the top), and at the second interface 22 (from the top). These echo indicators are indicated by the same reference numerals used in FIG. 4. In addition, the measurement signal in FIG. 5B includes an echo indicator 84 indicating reflection at the interface between the second transmission line probe member 40 and the connecting line 82, an echo indicator 86 indicating reflection at the interface between the connecting line 82 and the first transmission line probe member 38, an echo indicator 88 indicating reflection from below at the third interface 24, an echo indicator 90 indicating reflection from below at the second interface 22, and an echo indicator 92 indicating reflection from below at the first interface 20.

Due to the temporal separation between the echo indicators (74 and 76) indicating reflection of the first transmit signal $S_{T1}$ from above at substance interfaces, and the echo indicators (88, 90 and 92) indicating reflection of the second transmit signal $S_{T2}$ from below at substance interfaces, it will be straight-forward to identify echo indicators related to the first transmit signal $S_{T1}$ and echo indicators related to the second transmit signal $S_{T2}$.

Figures 6A, 6B:
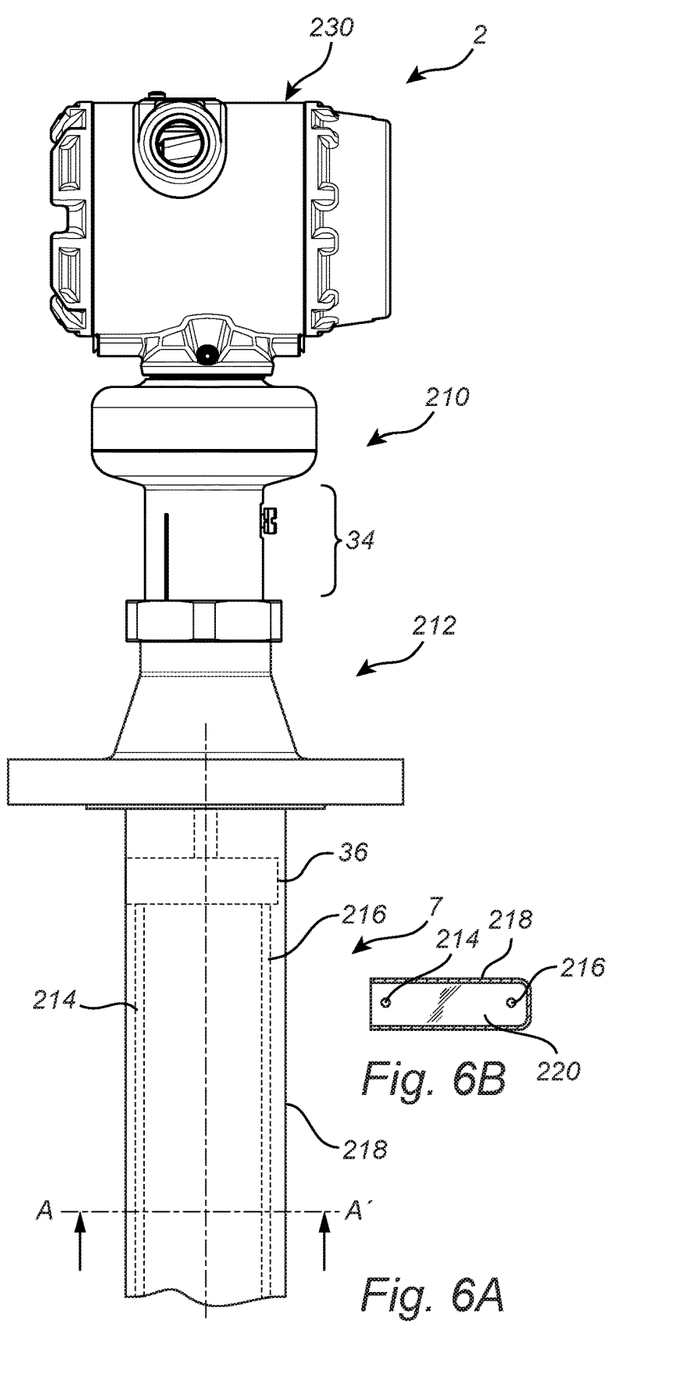
FIG. 6A schematically illustrates a third embodiment of the radar level gauge system in FIG. 1.
FIG. 6B is cross-section view of the transmission line probe arrangement comprised in the radar level gauge system in FIG. 6A.

With reference to FIGS. 6A-B, a third embodiment of the radar level gauge system 2 in FIG. 1 will be described.

FIG. 6A is a side-view of the radar level gauge system 2 comprising a measurement unit 210, a communication unit 230, a process connection 212, and an antenna arrangement 7. Referring to the description provided above in relation to the first and second embodiments of the radar level gauge system according to the invention, the measurement unit 210 comprises the transceiver 26, the processing circuitry 28, and the feed-through 34; and the communication unit 230 comprises the communication interface 30.

As is schematically indicated in FIG. 6A and in FIG. 6B, which is a cross section view of the antenna arrangement 7 in FIG. 6A, the antenna arrangement 7 comprises a first probe conductor 214, a second probe conductor 216, a shielding conductor 218, and a dielectric material 220, such as PTFE, enclosing the first 214 and second 216 probe conductors.

In this third embodiment, the first transmission line probe member 38 is formed by the first probe conductor 214 and portions of the shielding conductor 218 and dielectric material 220 adjacent to the first probe conductor 214. The second transmission line probe member 40 is formed by the second probe conductor 216 and portions of the shielding conductor 218 and dielectric material adjacent to the second probe conductor 216.

As will be apparent from the description related to coupling efficiency etc further above, the first transmission line probe member 38 has a coupling factor ($\alpha_1$) that is considerably higher than the coupling factor ($\alpha_2$) of the second transmission line probe member 40. As described above, the first 214 and second 216 probe conductors may or may not be conductively connected to each other at their lower ends.

Finally, with reference to FIGS. 7A-B, a fourth embodiment of the radar level gauge system 2 in FIG. 1 will be described.

Figures 7A, 7B:
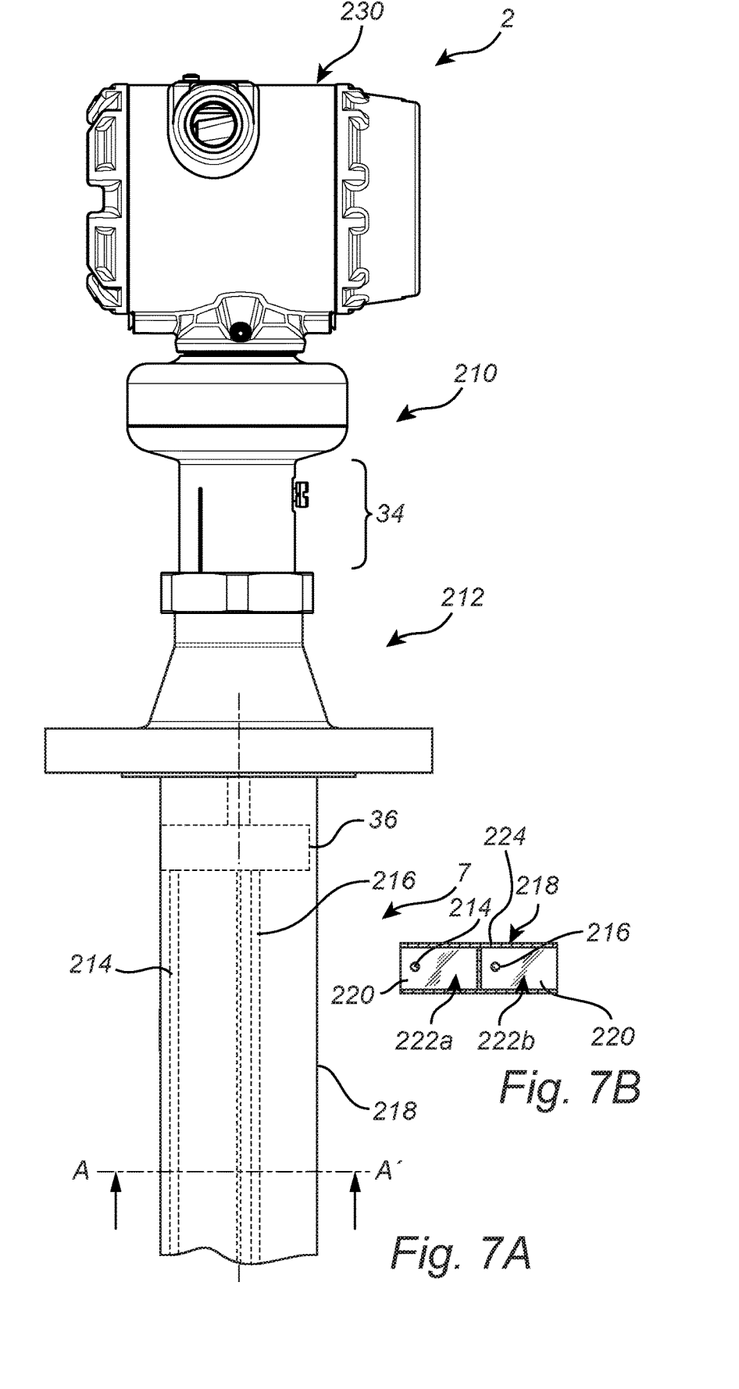
FIG. 7A schematically illustrates a fourth embodiment of the radar level gauge system in FIG. 1.
FIG. 7B is cross-section view of the transmission line probe arrangement comprised in the radar level gauge system in FIG. 7A.

As can be seen in FIGS. 7A-B, the radar level gauge system according to the fourth embodiment, mainly differs from the third embodiment in FIGS. 6A-B in that the shielding conductor 218 has a different configuration. Instead of the U-profile in FIG. 6B, the shielding conductor 218 in FIG. 7B has an H-profile. In the example embodiment of FIGS. 7A-B, the first 222*a* and second 222*b* channels on either side of the separating wall 224 are filled with the same dielectric material 220 (such as PTFE). To provide the desired different coupling factors ($\alpha_1$ and $\alpha_2$), the first probe conductor 214 is arranged more shallow in the first channel 222*a* than the second probe conductor 216 is in the second channel 222*b*.

The person skilled in the art realizes that the present invention by no means is limited to the preferred embodiments described above. For example, many other probe arrangements may be feasible. In particular, many other cross-sections of the shielding conductor 218 are possible, and may be advantageous. Furthermore, the cross-section of the shielding conductor 218 and/or the configuration of the dielectric material(s) may vary along the length of the probe arrangement 7. Such a variation or variations may advantageously be substantially continuous.

What is claimed is:

1. A radar level gauge system for installation at a tank containing a stratified substance composition including at least a first substance having a first density, a second substance having a second density greater than said first density, and a third substance having a third density greater than said second density, to determine a first level of a first interface between said first substance and said second substance, and a second level of a second interface between said second substance and said third substance, said radar level gauge system comprising:

a transceiver for generating and transmitting an electromagnetic transmit signal, and receiving an electromagnetic reflection signal;

a tank feed-through connected to said transceiver;

a power divider connected to said feed-through to divide the transmit signal from said transceiver into a first transmit signal and a second transmit signal, and to combine a first reflection signal and a second reflection signal to the reflection signal received by said transceiver;

a first transmission line probe member having an upper end connected to said power divider and being configured to guide the first transmit signal at least partly through said stratified substance composition towards a lower end of said first transmission probe member and to return said first reflection signal resulting from reflection of said first transmit signal at any impedance discontinuities encountered thereby, said first transmission line probe member being configured to provide an interaction between said first transmit signal and said stratified substance composition resulting in a first relatively large average attenuation of said first transmit signal;

a second transmission line probe member having an upper end connected to said power divider and configured to guide said second transmit signal at least partly through said stratified substance composition towards a lower end of said second transmission probe member and to return said second reflection signal resulting from reflection of said second transmit signal at any impedance discontinuities encountered thereby, said second transmission line probe member being configured to provide an interaction between said second transmit signal and said stratified substance composition resulting in a second relatively small average attenuation of said second transmit signal;

measurement signal forming circuitry connected to said transceiver for forming a measurement signal based on said reflection signal and a timing relation between said transmit signal and said reflection signal, said measurement signal comprising a first set of echo indicators indicating reflection of said first transmit signal at impedance discontinuities encountered by said first transmit signal, and a second set of echo indicators indicating reflection of said second transmit signal at impedance discontinuities encountered by said second transmit signal; and level determining circuitry for determining said first level based on at least one echo indicator from said first set of echo indicators, and determining said second level based on at least one echo indicator from said second set of echo indicators.

2. The radar level gauge system according to claim 1, wherein said second transmission line probe member comprises:
a probe conductor connected to said power divider; and
a first dielectric layer at least partly enclosing said probe conductor.

3. The radar level gauge system according to claim 2, wherein said first dielectric layer is configured to provide different coupling between said second transmit signal and a given surrounding medium at different positions along said second transmission line probe member.

4. The radar level gauge system according to claim 3, wherein said second dielectric layer is configured to provide a decreasing coupling between said second transmit signal and said given surrounding medium with increasing distance from said power divider.

5. The radar level gauge system according to claim 2, wherein said first transmission line probe member comprises:
a probe conductor connected to said power divider; and
a second dielectric layer, different from the first dielectric layer comprised in said second transmission line probe member, at least partly enclosing said probe conductor.

6. The radar level gauge system according to claim 5, wherein said second dielectric layer is configured to provide different coupling between said first transmit signal and a given surrounding medium at different positions along said first transmission line probe member.

7. The radar level gauge system according to claim 6, wherein said first dielectric layer is configured to provide a decreasing coupling between said first transmit signal and said given surrounding medium with increasing distance from said power divider.

8. The radar level gauge system according to claim 1, wherein said second transmission line probe member comprises:
a probe conductor connected to said power divider; and
a shielding conductor spaced apart from said probe conductor and extending along at least a portion of said second transmission line probe member.

9. The radar level gauge system according to claim 8, wherein said shielding conductor extends along at least said portion of said second transmission line probe starting from the upper end of said second transmission line probe member.

10. The radar level gauge system according to claim 1, wherein:
said first transmission line probe comprises a first probe conductor conductively connected to said power divider to receive said first transmit signal, and a shielding conductor extending along at least a portion of said first probe conductor; and
said second transmission line probe comprises a second probe conductor conductively connected to said power divider to receive said second transmit signal, and said shielding conductor extending along at least a portion of said first probe conductor and said second probe conductor.

11. The radar level gauge system according to claim 10, wherein said shielding conductor is configured to provide different coupling between at least one of said first transmit signal and said second transmit signal, and a given surrounding medium at different vertical positions in said tank.

12. The radar level gauge system according to claim 1, wherein:
said first transmission line probe member comprises a probe conductor connected to said power divider;
said second transmission line probe member comprises a probe conductor connected to said power divider; and
the probe conductor of said first transmission line probe member is conductively connected to the probe conductor of said second transmission line probe member at the lower ends of said first transmission line probe member and said second transmission line probe member.

13. The radar level gauge system according to claim 12, wherein the probe conductor of said first transmission line probe member is conductively connected to the probe conductor of said second transmission line probe member at the lower ends of said first transmission line probe member and said second transmission line probe member through a delay line for increasing a temporal separation between said first reflection signal and said second reflection signal.

14. The radar level gauge system according to claim 12, wherein said second transmission line probe member comprises a shielding conductor spaced apart from said probe conductor and extending along at least a portion of said second transmission line probe member.

15. The radar level gauge system according to claim 14, wherein said shielding conductor extends to the lower end of said second transmission line probe member.

16. The radar level gauge system according to claim 1, wherein at least one of said first transmission line probe member and said second transmission line probe member comprises a delay portion for increasing a temporal separation between said first reflection signal and said second reflection signal.

17. The radar level gauge system according to claim 1, further comprising echo identifying circuitry connected to said measurement signal forming circuitry for identifying said first set of echo indicators and said second set of echo indicators in said measurement signal.

18. A method of determining interface levels in a tank containing a stratified substance composition including at least a first substance having a first density, a second substance having a second density greater than said first density, and a third substance having a third density greater than said second density, using a radar level gauge system comprising:
- a transceiver;
- a feed-through connected to said transceiver;
- a power divider connected to said feed-through;
- a first transmission line probe member connected to said power divider and providing a first average attenuation for signal propagation through said stratified substance composition;
- a second transmission line probe member connected to said power divider and providing a second average attenuation, smaller than said first average attenuation, for signal propagation through said stratified substance composition; and
- processing circuitry, said method comprising the steps of:
- generating and transmitting, by said transceiver, an electromagnetic transmit signal;
- passing, by said feed-through, said transmit signal from the outside of said tank to an inside of said tank;
- dividing, by said power divider, said transmit signal into a first transmit signal and a second transmit signal;
- guiding, by said first transmission line probe member, said first transmit signal at least partly through said stratified substance composition;
- guiding, by said second transmission line probe member, said second transmit signal at least partly through said stratified substance composition;
- returning, by said first transmission line probe member, a first reflection signal resulting from reflection of said first transmit signal at any impedance discontinuities encountered thereby;
- returning, by said second transmission line probe member, a second reflection signal resulting from reflection of said second transmit signal at any impedance discontinuities encountered thereby;
- combining, by said power divider, said first reflection signal and said second reflection signal into a combined reflection signal;
- passing, by said feed-through, said combined reflection signal to said transceiver;
- receiving, by said transceiver, said combined reflection signal; and
- determining, by said processing circuitry, a first level of a first interface between said first substance and said second substance, and a second level of a second interface between said second substance and said third substance based on said combined reflection signal.

19. The method according to claim 18, wherein said step of determining comprises the steps of:
- forming a measurement signal based on said combined reflection signal and a timing relation between said transmit signal and said combined reflection signal, said measurement signal comprising a first set of echo indicators indicating reflection of said first transmit signal at impedance discontinuities encountered by said first transmit signal, and a second set of echo indicators indicating reflection of said second transmit signal at impedance discontinuites encountered by said first transmit signal; and
- determining said first level based on at least one echo indicator from said first set of echo indicators, and determining said second level based on at least one echo indicator from said second set of echo indicators.

20. The method according to claim 19, further comprising the step of:
- identifying said first set of echo indicators and said second set of echo indicators in said measurement signal.

\* \* \* \* \*